Dec. 22, 1942.　　　　A. A. CAMPBELL　　　　2,305,604
TRANSFER MECHANISM
Filed Oct. 11, 1941　　　　2 Sheets-Sheet 1

Inventor
Alvin A. Campbell

By G. J. Kersenich & J. H. Church
Attorneys

Dec. 22, 1942.    A. A. CAMPBELL    2,305,604
TRANSFER MECHANISM
Filed Oct. 11, 1941    2 Sheets-Sheet 2

Inventor
Alvin A. Campbell

By G J Kessenich & J H Church
Attorneys

Patented Dec. 22, 1942

2,305,604

UNITED STATES PATENT OFFICE 2,305,604

TRANSFER MECHANISM

Alvin A. Campbell, Hackettstown, N. J.

Application October 11, 1941, Serial No. 414,623

5 Claims. (Cl. 198—28)

(Granted under the act of March 3, 1883, as amended April 30, 1928; 370 O. G. 757)

The invention described herein may be manufactured and used by or for the Government for governmental purposes, without the payment to me of any royalty thereon.

This invention pertains to a transfer mechanism and more particularly to a device for transferring objects from one disk to another.

The purpose of the invention is to provide a transfer mechanism which is simple in construction, inexpensive to manufacture, economical in upkeep, strong and durable.

The specific nature of the invention as well as other objects and advantages thereof will clearly appear from a description of a preferred embodiment as shown in the accompanying drawings in which.

Figure 1:
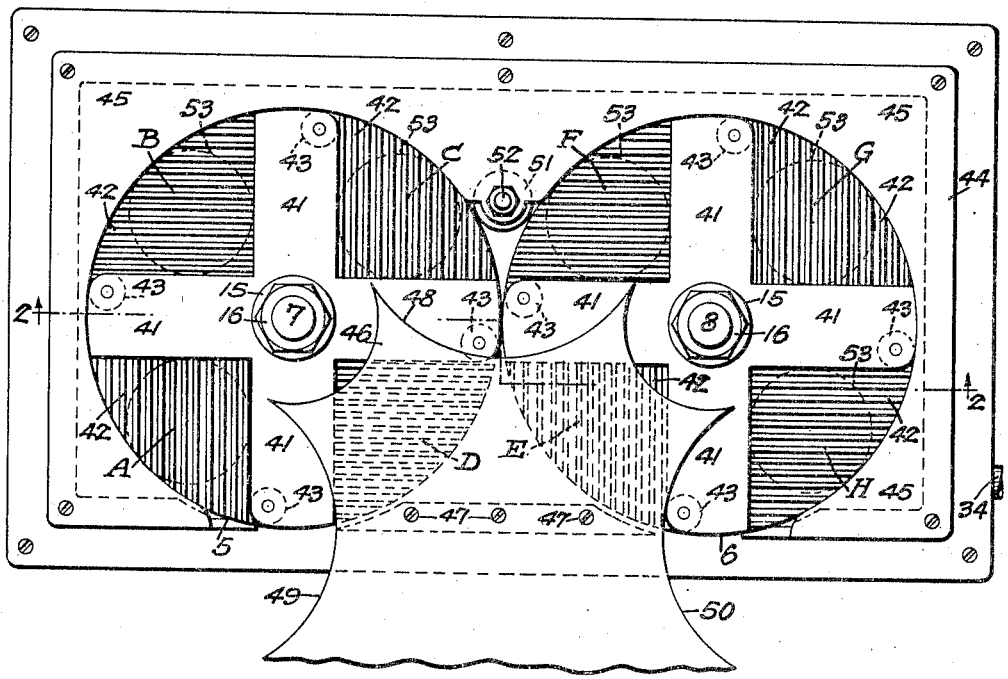
Fig. 1 is a plan view of a practical embodiment of the invention.
Figure 2:
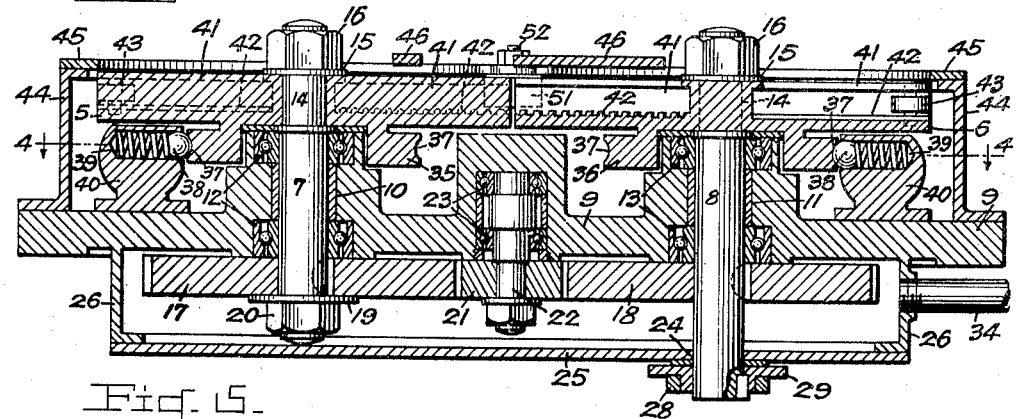
Fig. 2 is a sectional view on the line 2—2 of Fig. 1.

Referring to Figs. 1 and 2, a pair of coplanar tangential transfer disks 5 and 6 are mounted on vertical shafts 7 and 8. A base 9 is provided with a pair of bores 10 and 11, each of which retains a pair of bearing races 12 and 13. The shafts 7 and 8 are secured to the inner portions of these races. The upper end of each shaft has a neck portion 14 of reduced diameter to which is secured one of the disks by means of suitable washers 15 and nuts 16. The lower end of the shafts 7 and 8 have keyed thereto spur gears 17 and 18 respectively. Gear 17 is also retained on the shaft 7 by a washer and nut combination 19 and 20. Gears 17 and 18 are identical gears and are interconnected by an idler gear 21 which is mounted on a shaft 22 journalled in anti-friction bearings 23 press fitted in the base 9.

Figure 3:
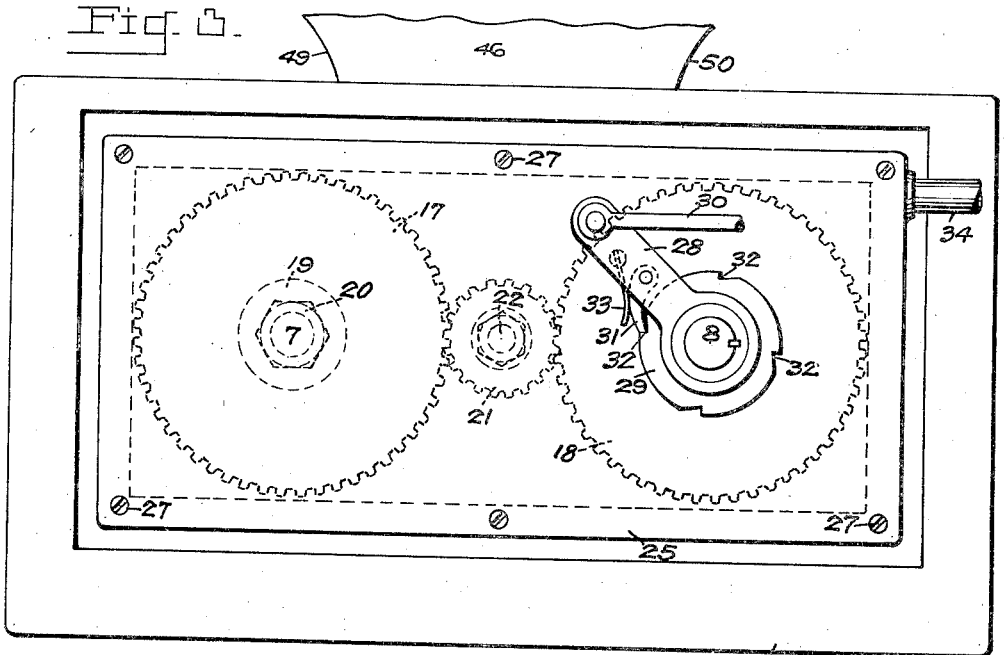
Fig. 3 is a bottom plan view showing the general arrangement of the drive and indexing mechanism.

The lower end of shaft 8 extends through a fluid-tight opening 24 in a bed plate 25 which is secured to a gear case 26 on the base 9 by suitable fasteners 27, see Figs. 2 and 3. A lever 28 is rotatably mounted on the outer end of this shaft and a ratchet wheel 29 is keyed thereto. To the extremity of the lever 28 is coupled a connecting rod 30 which is periodically reciprocated by means (not shown). Intermediate the ends of the lever 28 is a pivoted pawl 31 which is urged into engagement with the periphery and notches 32 in the ratchet wheel 29 by a leaf spring 33 secured to the lever. A fluid port 34 appears in the gear case 26 and serves to supply lubricant to the gears and the shaft bearings.

Figure 4:
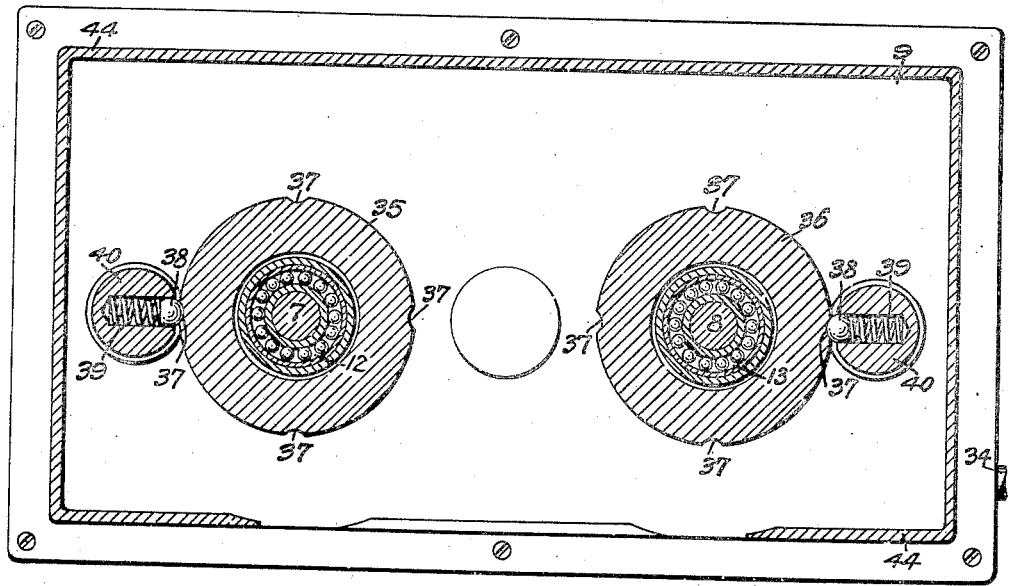
Fig. 4 is a sectional view on the line 4—4 of Fig. 2 illustrating the means for insuring proper alignment of the transfer disks after an indexing operation.

The lower portions of the transfer disks 5 and 6 are provided with aligning disks 35 and 36. Recesses 37 are spaced 90° apart on the peripheries of these disks as shown in Figs. 2 and 4 and are adapted to recurrently receive spring urged balls 38 lodged in bores 39 in studs 40 on the base 9 when the transfer disks are rotated.

The transfer disks are provided with radial arms 41 which are uniformly spaced on the top surface thereof. The instant device employs intersecting arms spaced 90° apart and are raised above work sustaining surfaces 42 so as to form stations or work holders A, B, C, D, E, F, G, and H. One edge of each arm is grooved or undercut so as to receive a small roller 43 near its outer extremity, see Figs. 1 and 2. The work sustaining surfaces 42 are smooth finished parallel ribs arranged as shown in Fig. 1. The group of ribs on opposite sides of one of the radial arms extend at right angles to each other. This arrangement best facilitates transfer of work members from one disk to another in a manner which will be described later.

The sides of the transfer mechanism are provided with a casing 44 which supports a horizontal guide plate 45. The guide plate has a cutout portion which conforms to the area of the tangential transfer disk, see Figs. 1 and 2. Above the transfer disks and the arms thereon is a deflector plate 46 which is secured to the casing 44 by suitable means 47. Deflector 46 has an arcuate surface 48 which facilitates the transfer of articles from one disk to another. The deflector shown in Fig. 1 has two oppositely directed concave surfaces 49 and 50 for a purpose which will be explained in another part of the specification.

Adjacent the point of tangency of the transfer disks and opposite the deflector 46 is a horizontal guide roller 51 which is rotatably mounted on a vertical shaft 52.

The instant device is adapted to transfer cylindrical objects such as shells from one disk or conveyor to another. Fig. 1 shows in broken lines shells 53 which are being moved from one position to another. The work holders are constructed so that a shell rests on a work sustaining surface 42 without projecting therebeyond and is confined in the angle of the radial arms 41 as shown in Fig. 1. This transfer mechanism may be effectively used in conjunction with processing apparatus such as mechanism for inserting and compacting increments of an explosive charge in the shells. A processing operation is performed on a shell at each station A, B, C, F, G, and H.

The disks 5 and 6 may be rotated continuously or may be given intermittent motion by being indexed 90° at a time. The transfer disks have equal diameters and the notches on ratchet wheel 29 are spaced 90° apart. When disk 6 is rotated clockwise through one quarter of a revolution, the disk 5 moves clockwise a corresponding amount. This means the disks have the same angular direction of motion but are moving linearly in opposite directions at the point of tangency, see Figs. 1 and 5.

The operation of the device is as follows: A shell is received at station A of disk 5. A loading operation is performed whereupon the disk is indexed 90° clockwise to bring the shell to the position indicated in Fig. 1 as station B. To insure proper alignment with the processing apparatus by preventing the disks from overrunning, the spring urged balls 38 snap into recesses 37 on aligning disks 35 and 36 at the end of the stroke of the connecting rod 30. An additional processing operation is performed at B and the shell is then moved to the station designated as C in Fig. 1 where the processing operations continue. When the disk is given its succeeding 90° movement, it is transferred from station C on disk 5 to the position corresponding to station F on disk 6 in Fig. 1.

Figure 5:
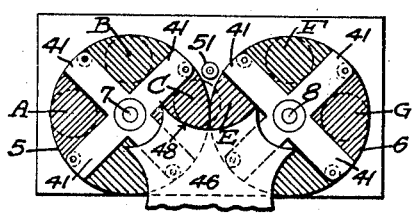
Fig. 5 is a diagrammatic plan view of the transfer mechanism with the disks rotated 45° from the position shown in Fig. 1.

Referring to Fig. 5, it will be observed that as the portion of the disk representing work holder or station C passes beneath the deflector 46, the vertical wall of the shell engages the arcuate surface 48. The arm 41 in back of the shell pushes or slides it along the concave surface 49 toward the oncoming work holder E on disk 6. As the shell is being slid over to holder E, an arm 41 on the disk 6 engages the shell and carries it about with that disk. Guide roller 51 acts to confine the shell in its correct path from station C to E. Toward the completion of the transfer of the shell, the roller 43 on the pushing arm 41 on the disk 5 imparts a thrust on the shell and cams it against the confining arms 41 of work holder E. At the end of the 90° indexing movement, the transferred shell assumes a position corresponding to that shown at station F of Fig. 1. Here a processing operation is performed and the shell is then successively advanced to stations G and H (Fig. 1) where it is further conditioned. The next movement of the disk 6 transfers the shell to another conveyor (not shown) by suitable means. Concave surfaces 49 and 50 are adapted to deflect articles to the disk 5 and from disk 6 in the same manner as does the arcuate surface 48.

While the above mentioned operation has been described in connection with a single shell, it will be understood that progressive processing of six shells is being accomplished simultaneously.

The perpendicular arrangement of the ribs on adjacent work sustaining surfaces promotes the facile movement of the shells from disk 5 to disk 6. The rib pattern of station C, Fig. 1, aids in retaining the shell against the curved surface 48 of the deflector during the initial indexing movement of the disks. When the disks reach a 45° position as shown in Fig. 5, the ribs of the adjoining stations C and E are parallel. During the next 25 or 26 degrees of movement in the same indexing operation, the shell advances more rapidly on to the work holder E. The ribs are approximately parallel to the line of travel of the shell on the holder E of disk 6 and aid in squarely placing the shell within the confines of the intersecting arms 41. Thus smoothness of movement during a transfer operation is increased.

I claim:

1. In a transfer mechanism for articles, a pair of coplanar tangential disks, spaced article holders on said disks having ribbed supporting surfaces, the ribs in one station of a disk extending perpendicular to those in a preceding station, means for rotating said disks in the same direction thereby recurrently presenting a pair of adjoining holders at the point of tangency, a concave deflector disposed above said disks near the point of tangency, said deflector adapted to guide an article from a holder on one disk to the adjoining holder on the other disk.

2. In a transfer mechanism for articles, a pair of coplanar tangential disks, spaced article holders on said disks having ribbed supporting surfaces, the ribs in one station of a disk extending at an angle to those in a preceding station, means for rotating said disks in the same direction thereby recurrently presenting a pair of adjoining holders at the point of tangency, a concave deflector disposed above said disks near the point of tangency, said deflector adapted to guide an article from a holder on one disk to the adjoining holder on the other disk.

3. In a transfer mechanism having an identical pair of substantially horizontal coplanar tangential disks rotatable in the same direction, spaced article holders on said disks, means for rotating said disks in unison and with corresponding holders in parallel, each of said holders having an article sustaining surface comprising parallel ribs, the ribs in the holders in one disk being arranged with respect to the ribs in the holders in the other disk whereby they are momentarily parallel when a pair of oppositely directed holders are periodically presented at the point of tangency.

4. In a transfer mechanism having an identical pair of substantially horizontal coplanar tangential disks rotatable in the same direction, spaced article holders on said disks, gear means for rotating said disks in unison and with corresponding holders in parallel, each of said holders having an article sustaining surface comprising parallel ribs, the ribs in one holder extending perpendicular to those in a preceding holder whereby the ribs in the pair of holders periodically presented at the point of tangency are momentarily parallel when said pair of holders is in substantial transferring alignment.

5. In a transfer mechanism for articles, a frame, a shaft journalled in said frame, a ratchet wheel coupled to said shaft and rotatable therewith, an arm pivoted to said shaft and independently rotatable thereon, a spring pressed pawl on said arm for engagement with said ratchet wheel, means for oscillating said arm whereby the shaft is periodically indexed, a disk coupled to said shaft and rotatable therewith, a gear keyed to said shaft, an idler shaft journalled in said frame, an idler gear on said shaft in engagement with said first gear, a second shaft journalled in said frame, a disk coupled to said shaft and rotatable therewith, said last named disk arranged in a coplanar tangential relation with said first named disk, a gear keyed to said second shaft and in engagement with said idler gear whereby said disks are rotatable in the same direction, spaced article holders on the disks, said disks arranged whereby a pair of adjoining holders are periodically presented at the point of tangency, said holders having ribbed supporting surfaces, the ribs in the holders in one disk being arranged with respect to the holders in the other disk whereby they are momentarily parallel when a pair of oppositely directed holders are periodically presented at the point of tangency, aligning means coupled to each of said disks and rotatable therewith, said means having spaced recesses each corresponding to a holder on its associated disk, spring means on said frame adapted to periodically engage certain of the recesses in said aligning means, an arcuate deflector disposed above said disks near the point of tangency, said deflector adapted to guide an article from a holder on one disk to the adjoining holder on the other disk, and a guide member on said frame adjacent the point of tangency and opposite said frame.

ALVIN A. CAMPBELL.